United States Patent
Ogikubo et al.

(10) Patent No.: US 6,650,827 B1
(45) Date of Patent: Nov. 18, 2003

(54) INFORMATION REPRODUCING APPARATUS

(75) Inventors: Takahiko Ogikubo, Tokorozawa (JP); Takeshi Mawatari, Tokorozawa (JP); Masato Hiratsuka, Tokorozawa (JP); Fumitsugu Ohtake, Tokorozawa (JP); Hirohide Kobori, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 09/396,197

(22) Filed: Sep. 15, 1999

(30) Foreign Application Priority Data

Sep. 18, 1998 (JP) ........................................... 10-265480

(51) Int. Cl.[7] ................................................ H04N 5/91
(52) U.S. Cl. ........................ 386/70; 386/126; 345/810; 369/30.01
(58) Field of Search .............................. 386/52, 55, 95, 386/96, 70, 125–126; 369/30.04, 30.01; 345/810, 811, 812, 813

(56) References Cited

U.S. PATENT DOCUMENTS

| | | | | |
|---|---|---|---|---|
| 5,592,450 A | * | 1/1997 | Yonemitsu et al. | 386/126 |
| 5,627,657 A | * | 5/1997 | Park | 386/70 |
| 5,889,746 A | * | 3/1999 | Moriyama et al. | 369/58 |
| 5,999,698 A | * | 12/1999 | Nakai et al. | 386/125 |
| 6,167,189 A | * | 12/2000 | Taira et al. | 386/95 |
| 6,393,201 B1 | * | 5/2002 | Sakuramoto et al. | 386/95 |
| 6,424,793 B1 | * | 7/2002 | Setogawa et al. | 386/95 |

* cited by examiner

*Primary Examiner*—Vincent Boccio
(74) *Attorney, Agent, or Firm*—Ladas & Parry (57) ABSTRACT

An apparatus for reproducing information units recorded on a recording medium in a hierarchical structure having a plurality of levels. In the hierarchical structure, the information units are divided into a plurality of groups, and the groups are respectively assigned to the levels. The apparatus includes: an input device that receives an input instruction to designate one of the information units; a number determination device that determines the number of the information units included in each group; a level determination device that determines, on the basis of a determination of the number determination device, one of the levels to be searched in order to identify the designated information unit; and a reproduction device that identifies the designated information unit by searching the level determined by the level designation device, and reproduces the identified information unit.

11 Claims, 9 Drawing Sheets

FIG. 2

PHYSICAL STRUCTRE OF RECORD INFORMATION
(PHYSICAL FORMAT)

INFORMATION REPRODUCING APPARATUS

BACKGROUND OF THE INVENTION

1. Field of the Invention

The present invention relates to an information reproducing apparatus for reproducing recording information from a recording medium such as an optical disk on which the recording information having the hierarchical structure including a plurality of levels is recorded and, more particularly, to an information reproducing apparatus for reproducing recording information from a high-density optical disk such as a DVD on which the recording information having the hierarchical structure including a plurality of levels is recorded.

2. Description of the Related Art

A DVD is a high-density optical disk having a recording capacity about seven times as large as that of a conventional CD (compact disk). In recent years, a high-density optical disk typified by a DVD has been widely applied to not only the field of audio apparatuses or video players but also the field of so-called car navigation systems.

Recording information of a large capacity recorded on a high-density optical disk normally has the hierarchical structure composed of a plurality of levels (or plurality of classes) in order to achieve an efficient search operation. Different kinds of information units are assigned to the respective levels.

Figure 1A:
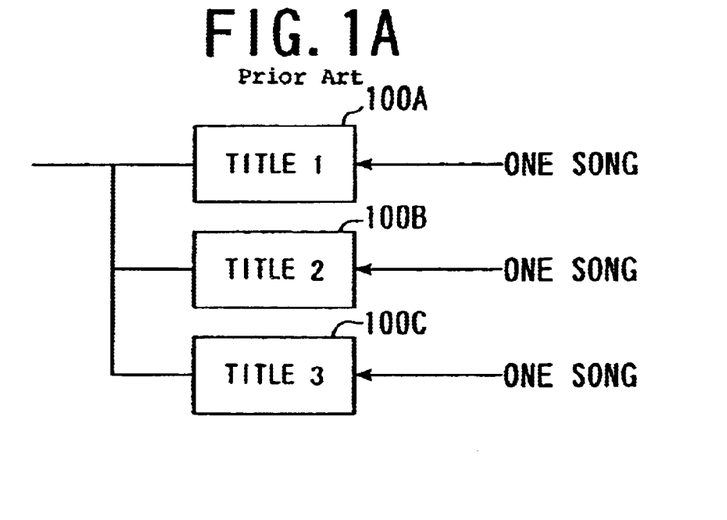
FIG. 1A is a diagram illustrating a format of recording information having the hierarchical structure of one level

FIG. 1A illustrates recording information having the hierarchical structure of one level. In the case where the hierarchical structure is of one level, the recording information includes only a plurality of information units of the same kind, and therefore, its structure becomes simple. Each of the information units is referred to as "a title." The recording information illustrated in FIG. 1A is composed of a plurality of titles 100A, 100B and 100C.

There are many cases where recording information having the hierarchical structure of one level is recorded on a DVD exclusive to a karaoke apparatus or sing-along machine, which is an apparatus or machine for playing karaoke music. The karaoke music is music which consists of accompaniments and back-chorus of songs.

The recording information recorded on the DVD exclusive to the karaoke music is composed of a plurality of karaoke songs and picture images respectively corresponding to the karaoke songs. In this case, one title is formed of one karaoke song and one set of picture images corresponding to the karaoke song.

Figure 1B:
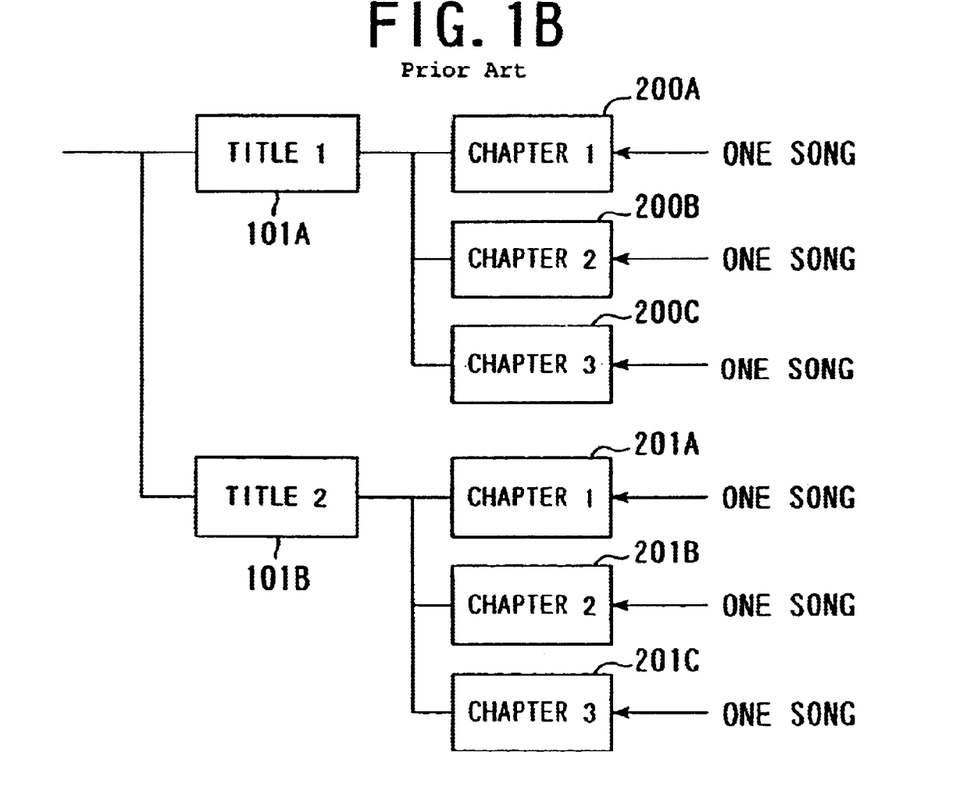
FIG. 1B is a diagram illustrating a format of recording information having the hierarchical structure of two levels.

FIG. 1B illustrates recording information having the hierarchical structure of two levels. In the case where the hierarchical structure is of two levels, the kind of information unit assigned to an high level is different from the kind of information unit assigned to a low level. The information unit assigned to the high level is referred to as a "title"; meanwhile, the information unit assigned to the low level is referred to as a "chapter". In the recording information illustrated in FIG 1B, titles 101A and 101B are assigned to the high level; meanwhile, chapters 200A, 200B, 200C . . . and chapters 201A, 201B, 201C . . . are assigned to the low level.

Recently, there has been a DVD exclusive to karaoke music, on which the recording information having the hierarchical structure of two levels is recorded. In the case of such a DVD exclusive to karaoke music, one chapter is formed of one karaoke song and one set of picture images corresponding to the karaoke song. One title is formed of a group of the plurality of chapters.

By the way, when a DVD reproducing apparatus or a DVD player reproduces the recording information recorded on the DVD, a user operates ten-keys (numerical switches) disposed in the DVD reproducing apparatus to designate an information unit to be reproduced. Specifically, the user operates the ten-key to input a numeral indicating the information unit to be reproduced. As a result, the DVD reproducing apparatus searches the DVD for the information unit to be reproduced according to the input numeral.

Here, in the case where the hierarchical structure of the recording information recorded on the DVD is of two levels, it is necessary to decide whether the input numeral is a numeral for designating the information unit assigned to the high level or it is a numeral for designating the information unit assigned to the low level. For example, if the recording information illustrated in FIG. 1B is recorded on the DVD, it is necessary to decide whether the input numeral is a numeral for designating the title or it is a numeral for designating the chapter.

The DVD reproducing apparatus decides whether the input numeral is a numeral for designating the title or it is a numeral for designating the chapter based on whether the DVD is operative or inoperative. That is, a numeral input during inoperation of the DVD is decided to be a numeral for designating the title; meanwhile, the numeral during operation of the DVD is decided to be a numeral for designating the chapter.

Furthermore, another type of DVD reproducing apparatus is provided with a title search function and a chapter search function, and moreover, with a search mode selecting function of allowing a user to select either one of the two search functions. The title search function is a function of searching for a title; and the chapter search function is a function of searching for a chapter.

However, in the DVD reproducing apparatus having the search mode selecting function, there arises a problem that the user must perform a cumbersome operation in order to execute either the title search function or the chapter search function.

As to this problem, the DVD exclusive to the karaoke music is exemplified for the explanation.

As described above, in the DVD exclusive to the karaoke music, on which the recording information having the hierarchical structure of two levels is recorded, one karaoke song corresponds to one chapter. Consequently, when a karaoke song is selected from the DVD, the user must first select the chapter search function, and then, input a numeral indicating a desired song. If the user erroneously inputs a numeral in the state in which the title search function is selected, the DVD reproducing apparatus recognizes the input numeral as a numeral for designating a title. This results in reproduction of a karaoke song which the user does not intend to select (a karaoke song arranged at the head of the title). In this case, the user must select his or her intended song again.

On the other hand, in the DVD exclusive to the karaoke music, on which the recording information having the hierarchical structure of one level is recorded, one karaoke song corresponds to one title. Consequently, when a karaoke song is selected from the DVD, the user must first select the title search function, and then, input a numeral indicating a desired karaoke song. If the user erroneously inputs a numeral in the state in which the chapter search function is selected, the DVD reproducing apparatus recognizes the input numeral as a numeral for designating a chapter. Therefore, the DVD reproducing apparatus may determine the input numeral to be ineffective. Also in this case, the user must select his or her intended song again.

Additionally, the user need to select either one of the title search function and the chapter search function according to whether the hierarchical structure of the recording information recorded on the DVD to be reproduced is of one level or of two levels. This operation is cumbersome.

Moreover, in the DVD reproducing apparatus in which it is decided whether the input numeral is a numeral for designating the title or it is a numeral for designating the chapter, based on whether the DVD is operative or inoperative, there arise following problems: in this type of DVD reproducing apparatus, when the reproduction is started in the inoperative state, the input numeral is normally recognized as a numeral indicating the title. Consequently, a complicated operation is needed in order to select an arbitrary song in the DVD exclusive to the karaoke music on which the recording information having the hierarchical structure of two levels is recorded.

SUMMARY OF THE INVENTION

An object of the present invention is to provide an information reproducing apparatus in which an information unit in recording information recorded on a recording medium can be speedily searched with certainty even if recording mediums having different hierarchical structures are loaded.

An information reproducing apparatus in accordance with the present invention is an apparatus for identifying one of a plurality of information units recorded on a recording medium, and reproducing the identified one of the plurality of information units. On the recording medium, the plurality of information units are arranged in a hierarchical structure having a plurality of levels. The plurality of information units are divided into a plurality of groups. The plurality of groups are respectively assigned to the plurality of levels.

The information reproducing apparatus includes: an input device that receives an input instruction to designate one of the plurality of information units; a number determination device that determines the number of the information units included in each of the plurality of groups; a level determination device that determines, on the basis of a determination of the number determination device, one of the plurality of levels to be searched in order to identify one of the plurality of information units corresponding to the designated one of the plurality of information units; and a reproduction device that identifies one of the plurality of information units corresponding to the designated one of the plurality of information units by searching one of the plurality of levels determined by the level determination device, and reproduces the identified one of the plurality of information units.

In the information reproducing apparatus, the input device receives an input instruction to designate one of the information units. The number determination device determines the number of the information units included in each group. On the basis of the determination of the number determination device, the level determination device determines the level to be searched in order to identify the information units designated by the input instruction. The reproduction device identifies the designated information unit, by searching the level determined by the level determination device. If the designated information unit is identified, the reproduction device reproduces the identified information unit.

For example, if the number of the information units included in one of the groups (it is referred to as a "group A") is greater than that of another one of the groups (it is referred to as a "group B"), there is a greater possibility that the designated information unit is included in the group A. Therefore, in such a case, the level determination device selects the level to which the group A is assigned as the level to be searched in order to identify the designated information unit.

Thus, the designated information unit can be speedily and efficiently identified, if the information units are arranged in any hierarchical structure.

In the above-mentioned information reproducing apparatus in accordance with the present invention, it is assumed that (i) the plurality of information units are arranged in a hierarchical structure having a high level and a low level, (ii) the plurality of information units are divided into a first group and a plurality of second groups, (iii) the first group is assigned to the high level, and the plurality of second groups are assigned to the second level, (iv) the plurality of second groups are respectively dependent on some or all of the plurality of information units included in the first group. In this case, the number determination device may determine the number of the information units included in the first group and a maximum number of the information units included in each of the plurality of second groups. And, the level determination device may determine that one of the plurality of levels to be searched in order to identify one of the plurality of information units corresponding to the designated one of the plurality of information units is the high level, when the number of the information units included in the first group is not less than a first predetermined number.

When the number of the information units included in the first group is not less than the first predetermined number, it is determined that the number of the information units included in the first group is relatively large. Therefore, there is a great possibility that the designated information unit is included in the first group. In this case, the level determination device may select the high level as the level to be searched in order to identify the designated information, because the first group is assigned to the high level.

Further, the level determination device may determine that one of the plurality of levels to be searched in order to identify one of the plurality of information units corresponding to the designated one of the plurality of information units is the low level, when the number of the information units included in the first group is less than the first predetermined number and when the maximum number of the information units included in each of the plurality of second groups is not less than a second predetermined number.

When the number of the information units included in the first group is less than the first predetermined number and when the maximum number of the information units included in each second group is not less than the second predetermined number, it is determined that the number of the information units included in the first group is relatively small, but the number of the information units included in each second unit is relatively large. Therefore, there is a great possibility that the designated information unit is included in any one of the second groups. In this case, the level determination device may select the low level as the level to be searched in order to identify the designated information unit, because the second groups are assigned to the low level.

Further, the level determination device may determine that one of the plurality of levels to be searched in order to identify one of the plurality of information units corresponding to the designated one of the plurality of information units is the high level, when the number of the information units included in the first group is less than the first predetermined number and when the maximum number of the information units included in each of the plurality of second groups is less than the second predetermined number.

When the number of the information units included in the first group is less than the first predetermined number and when the maximum number of the information units included in each second group is less than the second predetermined number, it is determined that both of the number of the information units included in the first group and the number of the information units included in each second group are relatively small. In such a case, the level determination device may select the high level as the level to be searched in order to identify the designated information.

In the above-mentioned information reproducing apparatus in accordance with the present invention, the input device may receive the input instruction to designate one of the plurality of information units, in order to search the recording medium. Therefore, the search operation in the information reproducing apparatus can be speedily and efficiently carried out.

In the above-mentioned information reproducing apparatus in accordance with the present invention, the input device may receive the input instruction to designate one of the plurality of information units, in order to reserve a reproduction of the designated information unit. Therefore, the reservation for reproduction of information units can be speedily and efficiently carried out.

In the above-mentioned information reproducing apparatus in accordance with the present invention, the input device may have a plurality of numerical switches to designate one of the plurality of information units. Therefore, the information unit designated by the numerical switches can be speedily and efficiently identified.

In the above-mentioned information reproducing apparatus in accordance with the present invention, each of the plurality of information units may be a karaoke song data. Therefore, one of the karaoke songs can be speedily and efficiently identified.

In the above-mentioned information reproducing apparatus in accordance with the present invention, it is preferable that the first predetermined number is six, and it is preferable that the second predetermined number is six. In a recording medium exclusive to karaoke music, such as a DVD exclusive to karaoke music, the number of the information units recorded on one recording medium is six or more. Therefore, in the recording medium exclusive to karaoke music, if the number of the information units included in one group is equal to six or greater than six, there is a great possibility that the designated information unit is included in the group. Thus, in the case where a recording medium exclusive to karaoke music is reproduced by the information reproducing apparatus in accordance with the present invention, each of the predetermined first number and the predetermined second number is set to six. Accordingly, the processing of reproducing the karaoke music can be speedily and efficiently carried out.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Next, a description will be given of embodiments according to the present invention with reference to the drawings.

In the following description, there will be exemplified that the present invention is applied to an information reproducing apparatus for reproducing recording information recorded on a DVD.

(1) DVD

First of all, explanation will be made on the format, logical configuration and operation of the DVD on which recording information including picture information and audio information are recorded, with reference to FIGS. 2 to 4.

Figure 2:
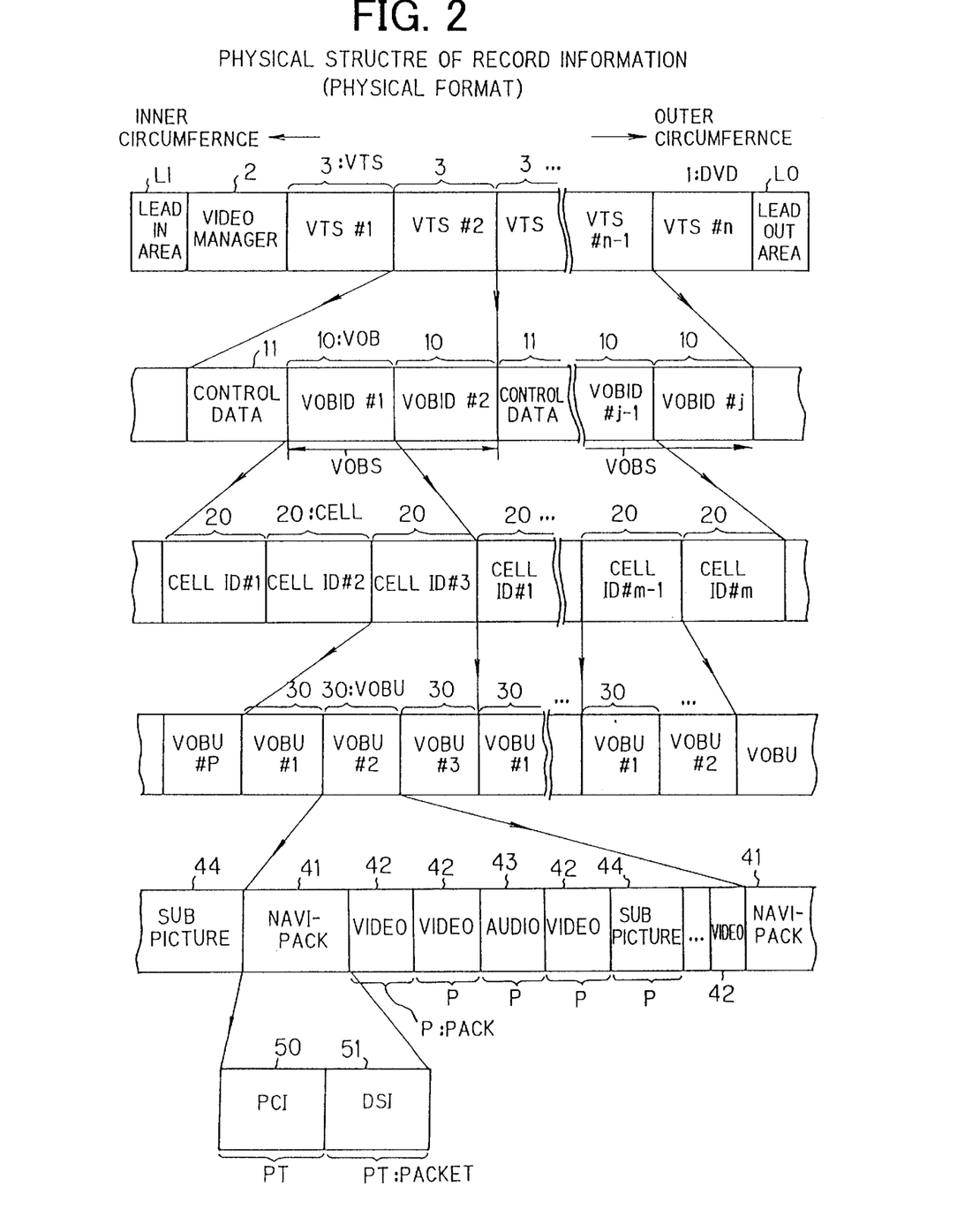
FIG. 2 is a diagram illustrating a recording format of a DVD in an embodiment of the present invention.
Figure 3:
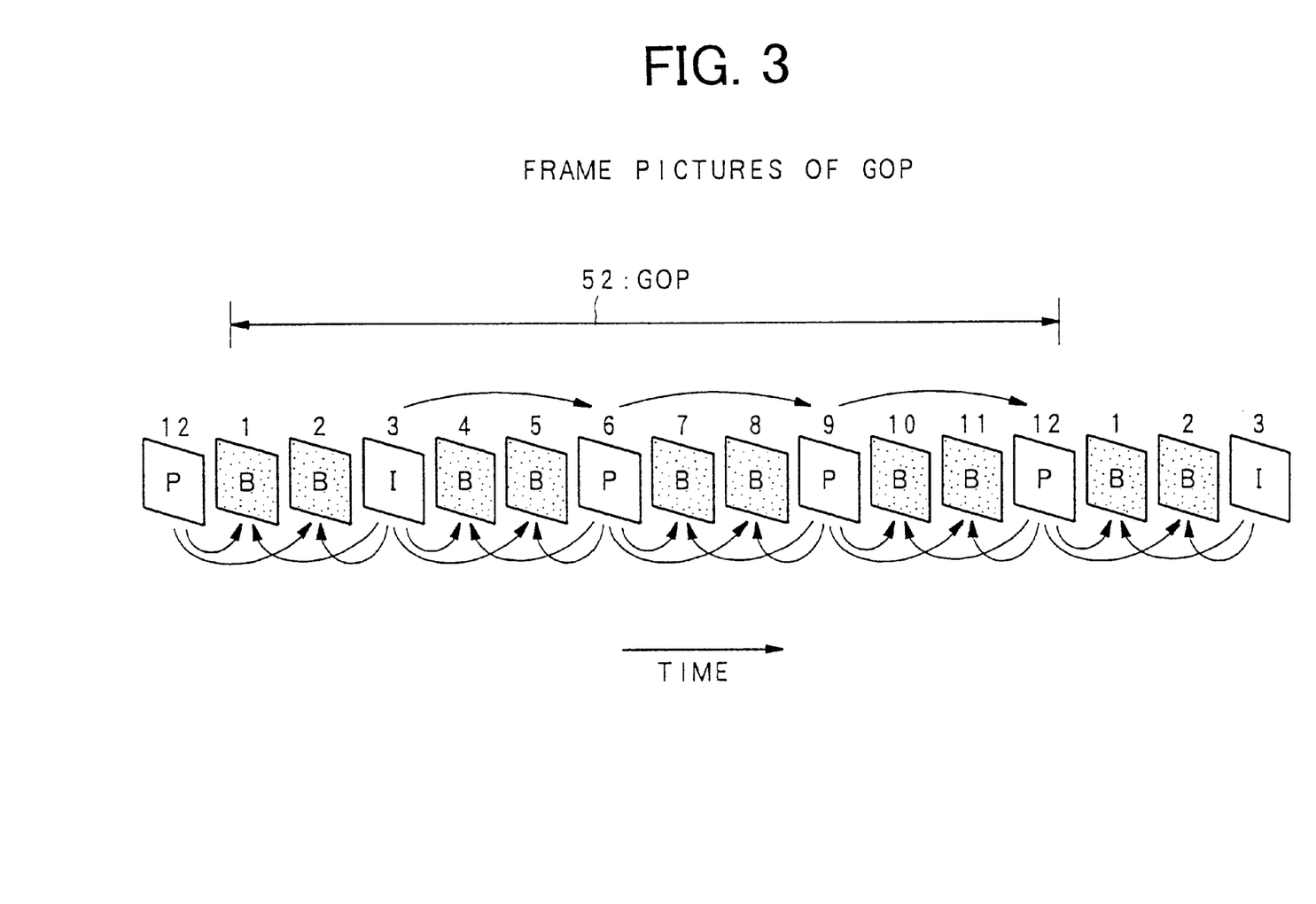
FIG. 3 is a diagram illustrating the configuration of a frame picture image constituting a group of pictures (GOP) in the embodiment of the present invention.

FIG. 2 illustrates a recording format on the DVD, of recording information including picture information and audio information (including music information). As illustrated in FIG. 2, the DVD is provided at the innermost circumference thereof with a lead-in area LI and at the outermost periphery thereof with a lead-out area LO, between which the picture information and the audio information are recorded. The picture information and the audio information are independently divided into a plurality of VTS 3 (Video Title Sets) 3 having respective ID (identification) numbers (#1 to #n).

The VTS refers to a set of relevant titles. A title connotes one work such as a movie, which a producer intends to present to a viewer as his one work. For example, a plurality of titles having common attributes, such as the number of audio information and sub-picture information (information of an auxiliary picture such as a super in a movie) included in one work, the specification and the corresponding language are integrated into one VTS 3. More specifically, as for one and the same movie, a plurality of movies of different language self may be recorded in one VTS 3 as titles, or a movie having respective titles for a theater version and a special version may be recorded in one VTS 3, although they are the versions of one same movie.

At the head of the region in which the VTSs 3 are recorded, a video manager 2 is recorded. Information recorded as the video manager 2 includes information relating to the entirety of the picture information and audio information recorded on the DVD such as a menu representing each name of titles, information for preventing an illegal copy, and an access table for giving access to the titles.

Subsequently, one VTS 3 is divided into a plurality of VOBs 10 each having an ID number, starting from control data 11.

Here, a section composed of the plurality of VOBs 10 is referred to as a VOB set (VOBS). The concept of the VOBS is established for distinguishing the control data 11, which is another data constituting the VTS 3, and the section of the plurality of VOBs 10 serving as the substance of the picture information and audio information.

In the control data 11 recorded at the head of the VTS 3, information such as PGCI (Program Chain Information) is recorded. The PGCI is various kinds of information relating to a program chain. The program chain signifies a logical section having a combination of a plurality of cells.

On each of the VOBs 10, substantial parts of picture information or audio information is recorded in addition to the control information.

Furthermore, each of the VOBs 10 is composed of a plurality of cells 20 each having an ID number. Each of the VOB 10 is configured so as to be completed with the plurality of cells 20, wherein one cell 20 cannot stride across the two VOBs 10.

Next, each of the cells 20 is composed of a plurality of VOB units (VOBUs) 30 each having an ID number. The VOBU 30 signifies an information unit including the picture information, audio information and sub-picture information.

Each of the VOBUs 30 is composed of a navigation pack 41, video data 42 (picture information), audio data 43 (audio information) and a sub-picture data 44 (sub-picture information). Namely, the picture information is recorded on the VOBU 30 as the video data 42; the audio information is recorded on the VOBU 30 as the audio data 43; and the sub-picture information is recorded on the VOBU 30 as the sub-picture data 44. In the navigation pack 41, control information for controlling the video data 42, the audio data 43 and the sub-picture data 44 is stored.

Here, only the picture information is recorded as the video data 42; and only the audio information is recorded as the audio data 43. Furthermore, only the sub-picture information is recorded as the sub-picture data 44. The sub-picture information includes graphic data such as characters and figures. Eight kinds of audio (or voice) can be recorded on the DVD; and 32 kinds of sub-pictures can be recorded on the DVD. These numbers of kinds are defined by the DVD standard.

The VOBUs 30 are recorded in such a manner that a reproducing time for one of the VOBUs 30 ranges from 0.4 sec to 1 sec. The reproducing time for one of the VOBUs 30 signifies a reproducing time for data recorded between one navigation pack 41 and a next navigation pack 41.

The reason for setting the reproducing time for one of the VOBUs 30 to 0.4 sec or longer is to reduce a recording capacity of a PCI buffer in an information reproducing apparatus described later; and further, the reason for setting it to 1.0 sec or shorter is that an allowable delay time required for decoding the video data 42, defined by the standard of the MPEG2 (Moving Picture Experts Group 2) system is 1 sec. Consequently, the navigation pack 41 always can be detected once per period from 0.4 sec to 1 sec during reproduction.

The navigation pack 41 always exists at the head of one of the VOBUs 30. The video data 42, the audio data 43 and the sub-picture data 44 need not always exist in the VOBU 30, and moreover, the number and order may be arbitrarily set in the case of their existence.

Each, section of the video data 42, the audio data 43 and the sub-picture data 44 illustrated in FIG. 2 is referred to as a pack P. That is, in one of the VOBUs 30, the video data 42, the audio data 43 and the sub-picture data 44 are divided into and recorded in the packs P, respectively. The pack P in which the video data 42 is recorded is referred to a video pack; the pack P in which the audio data 43 is recorded is referred to an audio pack; and the pack P in which the sub-picture data 44 is recorded is referred to a sub-picture pack.

Furthermore, at the pack header recorded at the head of each of the packs P, read starting time information called an SCR (System Clock Reference) is recorded, SCR is information representing read starting time on a reproducing time axis where data included in each of the packs P should be read from a buffer memory in the information reproducing apparatus.

In the DVD of the present embodiment, one of the packs P is composed of one packet. The pack P may be composed of a plurality of packets.

The navigation pack 41 is composed of DSI (Data Search Information) data 51 and PCI (Presentation Control Information) data 50. The DSI data 51 is search information for searching picture information or audio information intended to be reproduced and displayed (specifically, an address on the DVD in which picture information or audio information intended to be reproduced and displayed is recorded, or the like). The PCI data 50 is information relating to reproducing/displaying control in displaying or reproducing the picture information or audio information searched on the basis of the DSI data 51. The DSI data 51 and the PCI data 50 are recorded as packets PT, respectively. The packet PT of the DSI data 51 is referred to as a DSI packet; and the packet PT of the PCI data 50 is referred to as a PCI packet.

All of the video data 42 included in one of the VOBUs 30 is composed of one or more GOPs (Group of Pictures).

The PCI data 50 includes highlight information. Highlight information is information defining, with respect to a selection item selected by a viewer, displaying or operation at the time the item is selected. Based on this highlight information, for example, variations of screen display with respect to item selection, a displaying position to be varied according to the selection, a command with respect to the selected item (instructions representing operation to be executed with respect to the selected item), or the like on a picture image (a menu screen) displaying the items to be selected by the viewer are set. Herein, picture image information for displaying frames, selection buttons or the like required for constituting the menu screen and displaying it is recorded as the sub-picture data 44 as the sub-picture information.

Furthermore, the GOP is a minimum picture unit which can be reproduced alone, defined by the standard of the MPEG2 system. The MPEG2 system is a picture image compression system used when the picture information is recorded in the DVD in the present embodiment. Information (reproducing/displaying time information) representing the reproducing time on the reproducing time axis displaying the video data 42 included in the GOP is recorded at the head of each of the GOPs. This information is termed PTS (Presentation Time Stamp).

Here, the outline of the MPEG2 system will be explained below. In most cases, frame pictures before and after a piece of frame picture are generally similar to each other and form a mutual relationship with each other in the continuous frame pictures. In consideration of this feature in the MPEG2 system, another frame picture existing between the plurality of frame pictures is produced by interpolative calculation based on a motion vector of an original picture with reference to the plurality of frame pictures to be transmitted apart with several frames. In this case, in the case where another frame picture is recorded, only by recording information relating to a difference between the plurality of frame pictures and the motion vector, the frame picture can be reproduced by prediction from the plurality of frame pictures with reference to the information. Thus, the picture image can be recorded in the compressed state.

Furthermore, the outline of the GOP will be explained below with reference to FIG. 3. FIG. 3 illiterates an example of a plurality of frame pictures constituting one GOP. In FIG. 3, the case where one GOP 52 is composed of twelve pieces of frame pictures is shown. There is no limitation in the number of frame pictures included in one GOP 52. In the GOP 52, a frame picture designated by a character "I" is referred to an I picture (Intra-coded picture). The I picture is a frame picture which can reproduce a complete frame picture only by its own picture. A frame picture designated by a character "P" is referred to a P picture (Predictive-coded picture). The P picture is a predictive picture produced by decoding a difference between the same and a predictive picture compensatorily reproduced on the basis of an already decoded I picture or another P picture. A frame picture designated by a character "B" is referred to a B picture (Bidirectionally predictive-coded picture). The B picture is a predictive picture reproduced by prediction by using not only an already decoded I picture or another P picture but also a timewise future I picture or P picture recorded in the DVD. In FIG. 3, the predictive relationship (interpolative relationship) between the pictures is indicated by arrows.

The MPEG2 system used in the DVD according the present embodiment adopts a variable rate system in which a data quantity included in each of the GOPs 52 is not fixed. That is, each picture included in the GOP 52 corresponds to a motion picture which move speedily. In the case where the correlation between the pictures is small, a data quantity constituting the pictures becomes great, and therefore, the data quantity included in the GOP 52 also becomes great. In contrast, in the case where the pictures included in the GOP 52 correspond to motion pictures which do not move very speedily and the correlation between the pictures is great, the data quantity constituting the pictures becomes small, and therefore, the data quantity included in the GOP 52 also becomes small.

The sections in the recording format having the hierarchical structure illustrated in FIG. 2 may be freely set as intended by the producer.

Subsequently, the logical format will be explained with reference to FIG. 4. The logical format signifies the logical structure of data formed at the time of reproduction of the DVD. In reproducing the DVD, the data recorded in the DVD is combined on the basis of the logical format. Namely, the above-described recording format is the structure of data recorded on the DVD; meanwhile, the logical format is the data structure which is formed inside the reproducing apparatus when the data read from the DVD is reproduced. Information for forming the logical format is recorded mainly in the control data 11 as access information or time information.

For the sake of clear explanation, a description will be given from the low level of the hierarchy in FIG. 4. One program 60 is constituted of the combination of the plurality of cells 20. The selection between the cells depends on the intention of the producer of the program 60.

The program 60 is a minimum logical unit, to which the information reproducing apparatus can give access on the basis of a command.

Here, a minimum unit which is composed of one or more programs 60 and is freely selected and viewed by a viewer, is termed a PTT (Part of Title). The PTT is freely defined as intended by the producer.

In the present embodiment, the PTT corresponds to the chapter.

One and the same cell 20 can be used in different programs 60.

Next, a PGC (Program Chain) 61 is logically constituted by combining the plurality of programs 60 as intended by the producer. The above-described PGCI is defined per PGC 61.

The PGCI includes: (i) information representing the reproducing order of the cells 20 per each program 60 in reproducing the program 60 (the inherent program number is assigned to each of the programs 60 in the reproducing order); (ii) an address of the cell 20, serving as a recording position on the DVD; (iii) the number of the header cell 20 to be reproduced in the program 60; (iv) a reproducing system of the program 60; and (v) various commands (commands Which can be designated by the producer per PGC 61 or cell 20). The reproducing systems for the programs 60 comprise a random reproducing system, a shuffle reproducing system and a loop reproducing system. The random reproducing system is a reproducing system which uses random numbers and allows reproduction of the same program 60 a plurality of times. The shuffle reproducing system is a random reproducing system which uses random numbers and prohibits reproduction of the same program 60 twice or more. The loop reproducing system is a reproducing system for reproducing one PGC 61 many times. These reproducing systems can be set for each PGC 61 as intended by the producer.

Although the PGCI is recorded as mainly a part of the control data 11 (see FIG. 2), the PGCI is recorded as a part of the video manager 2 in the case where the PGCI is one relating to a menu inside the video manager 2.

Furthermore, one PGC 61 includes one or more programs 60 in addition to the PGCI.

One and the same cell 20 can be used in different PGC 61.

The order of the cells 20 in one program 60 is not limited to the order in which the cells 20 are recorded on the DVD. The order of the cells 20 in one program 60 may or may not accord with the order in which the cells 20 are recorded on the DVD. For example, the cell 20 recorded behind on the DVD may be arranged ahead. The order of the cells 20 in one program 60 can be freely set as intended by the producer.

Next, one title 62 is composed of one or more PGCs 61. The title 62 is a unit corresponding to, for example, a movie or a book, and further, is complete information which the producer wants to provide for the viewer of the DVD.

One or more titles 62 constitute one VTS 63. The titles 62 included in the VTS 63 have attributes common to each other. For example, movies of different languages despite of one and the same movie correspond to the titles 62.

Figure 4:
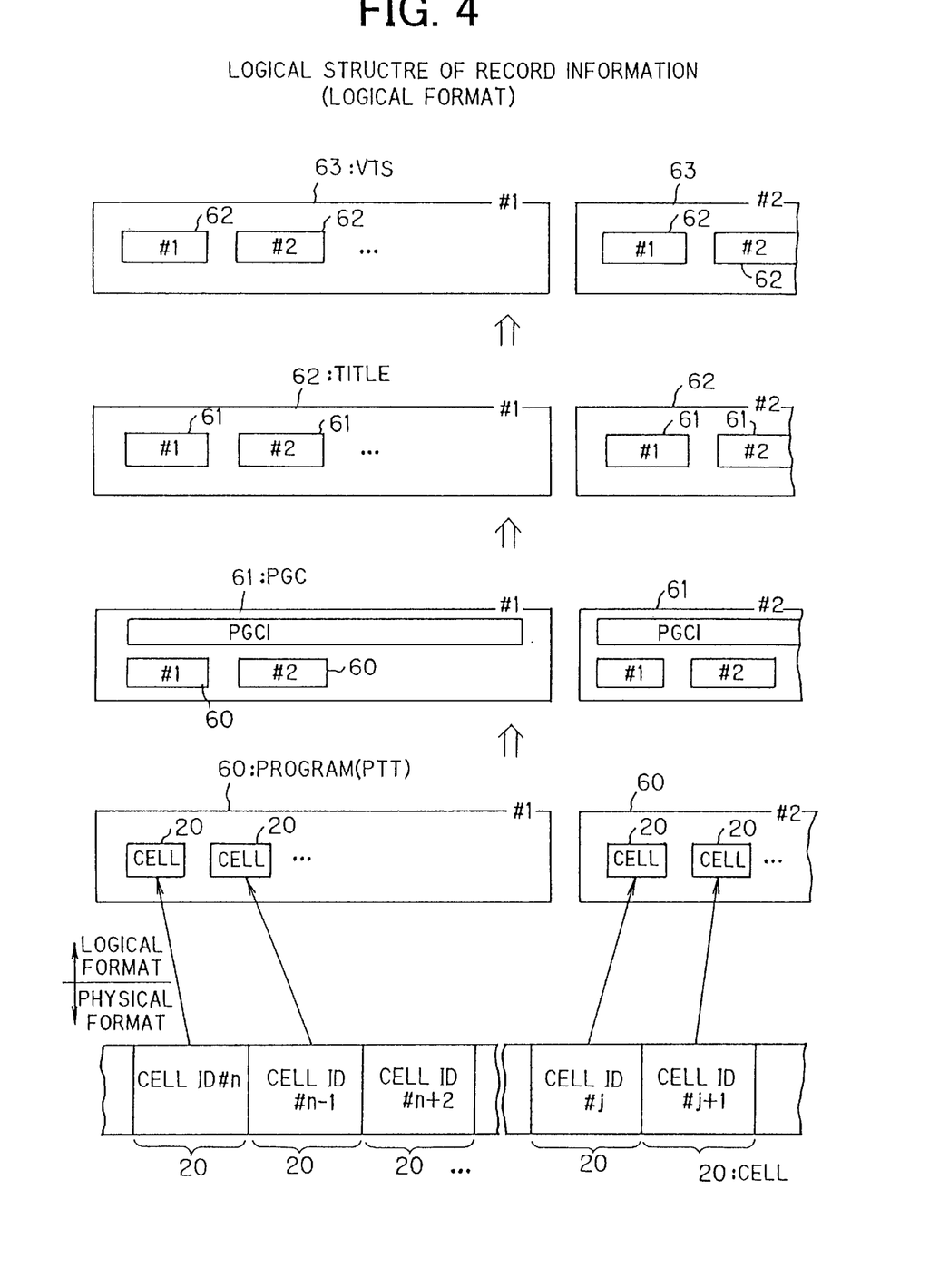
FIG. 4 is a diagram illustrating a logical format of the DVD in the embodiment of the present invention.

Information corresponding to one VTS 63 illustrated in FIG. 4 corresponds to information included in one VTS 3 illustrated in FIG. 2. That is, all the information logically included inside the VTS 63 illustrated in FIG. 4 is recorded in the DVD as one VTS 3.

Figure 5:
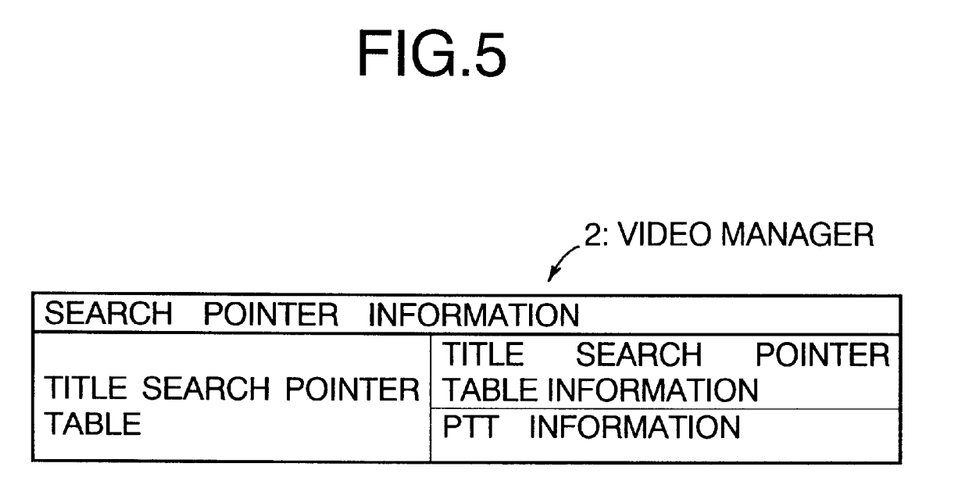
FIG. 5 is a diagram contents of a video manager of the DVD in the embodiment of the present invention.

Next, explanation will be made on the recording format of the DVD again. Referring back to FIG. 2, the video manager 2 is recorded on the DVD together with VTSs 3. The concrete contents of the video manager 2 will be further explained hereinafter. FIG. 5 illustrates the concrete contents of the video manager 2. As shown in FIG. 5, the video manager 2 includes video manager information including search pointer information for searching the title 62. Furthermore, the video manager information includes table information called a title search pointer table.

In this title search pointer table, title search pointer table information is written. The title search pointer table information is inclusive of the number of title search pointers. The number of title search pointers is equal to the number of titles 62 recorded in the DVD. Consequently, access to the title search pointer table information can teach the number of titles 62 recorded in the DVD.

Moreover, in the title search pointer table, PTT information is written. The PTT information indicates the number of PTTs included in each of the titles 62. That is, the PTT information is data representing, per title, the number of PTTs included in the title.

Subsequently, explanation will be made on the logical format of the DVD exclusive to the karaoke music. The logical format illustrated in FIG. 4 is a logical format in a general DVD. This logical format uses the hierarchical structure having numerous levels in order to achieve complicated reproduction such as reproduction of a movie with a plurality of supers of different languages. However, since such complicated reproduction is not always required in the DVD exclusive to the karaoke music, a logical format having less levels than those in the logical format illustrated in FIG. 4 is used in the DVD exclusive to the karaoke music.

Figure 6A:
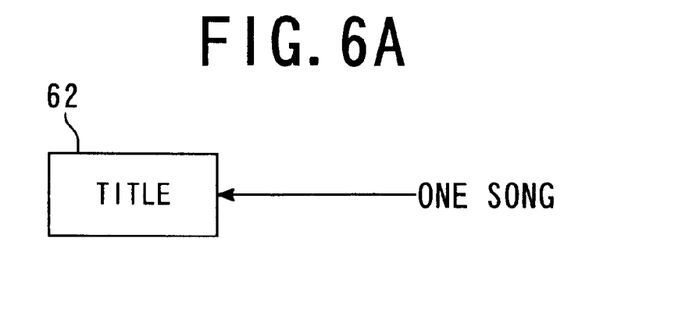
FIG. 6A is a diagram illustrating a first structure included in a hierarchical structure of recording information recorded on a DVD exclusive to karaoke music in the embodiment of the present invention.
Figure 6B:
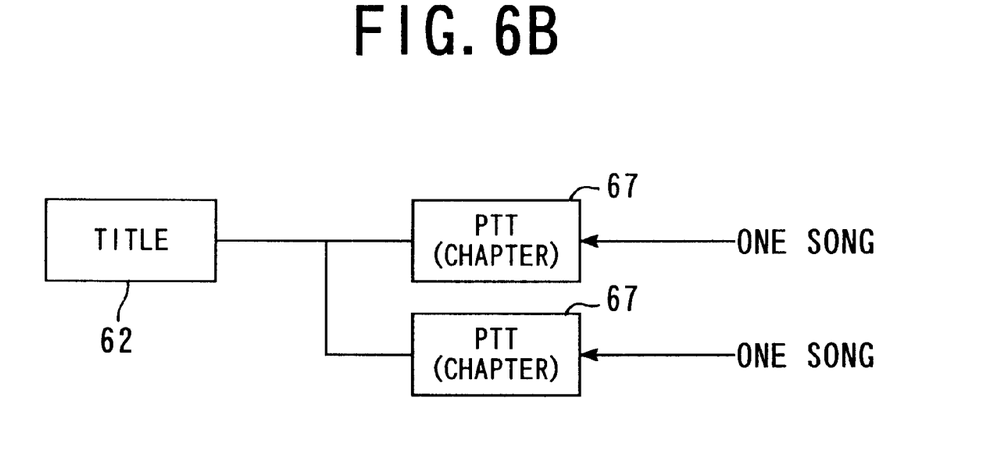
FIG. 6B is a diagram illustrating a second structure included in the hierarchical structure of recording information recorded on a DVD exclusive to karaoke music in the embodiment of the present invention.

Referring to FIGS. 6A and 6B, examples of the hierarchical structures typically used for a part of the hierarchical structure of the DVD exclusive to the karaoke music will be described.

FIG. 6A illustrates a first structure used for a part of the hierarchical structure of the DVD exclusive to the karaoke music. In the first structure, one title 62 is composed only of one PGC 61, which corresponds to one karaoke song. No program 60 exists on the logical format in the first structure.

FIG. 6B illustrates a second structure used for a part of the hierarchical structure of the DVD exclusive to the karaoke music. In the second structure, one or more PTTs 67 composed of one or more programs 60 are arranged at the level lower than that of the title 62, wherein each PTT 67 corresponds to one karaoke song.

Figure 7:
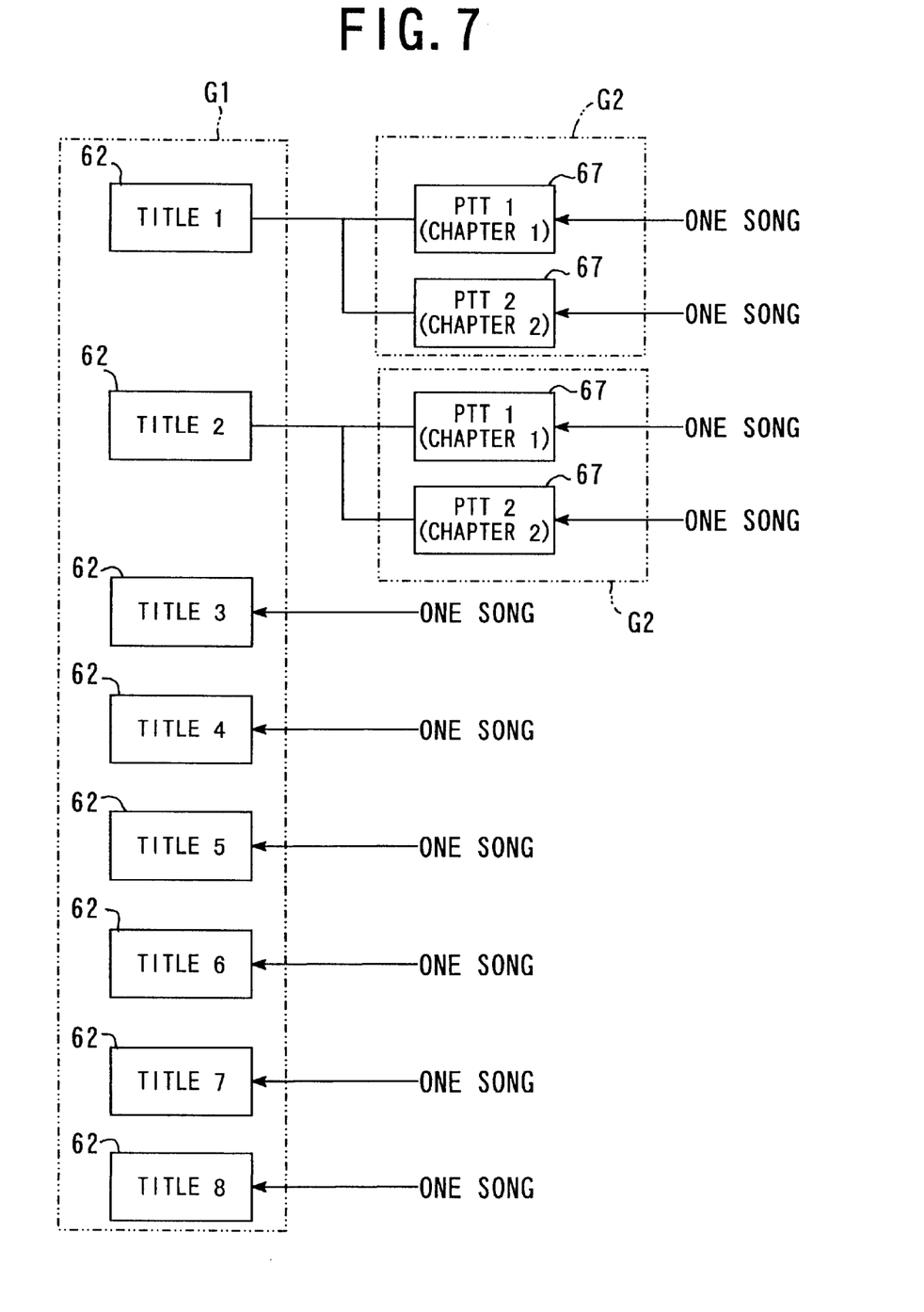
FIG. 7 is a diagram illustrating an example of a hierarchical structure of recording information recorded on a DVD exclusive to karaoke music in the embodiment of the present invention.

FIG. 7 illustrates an example of the hierarchical structure of the DVD exclusive to the karaoke music, in which the first structure and the second structure exist in mixture.

As shown in FIG. 7, eight titles 62 are assigned to the high level of the hierarchical structure. The eight titles 62 are included in a logical group G1. Four PTTs 67 are assigned to the low level of the hierarchical structure. The four PTTs 67 are divided into two logical groups G2. Each of the groups G2 is dependent on the corresponding title 62.

In addition, the hierarchical structure of the DVD exclusive to the karaoke music is not limited to one illustrated in FIG. 7. For example, there is another DVD exclusive to karaoke music in which only the first structure is used for recording songs while only the second structure is used only for recording picture images for title backs or the like.

Although the VTS 63 is provided in the DVD exclusive to the karaoke music, a search operation in the information reproducing apparatus S, described later, is performed with respect to the levels lower than that of the title 62, so that the VTS 63 is omitted in FIGS. 6A and 6B.

(II) Information Reproducing Apparatus

Figure 8:
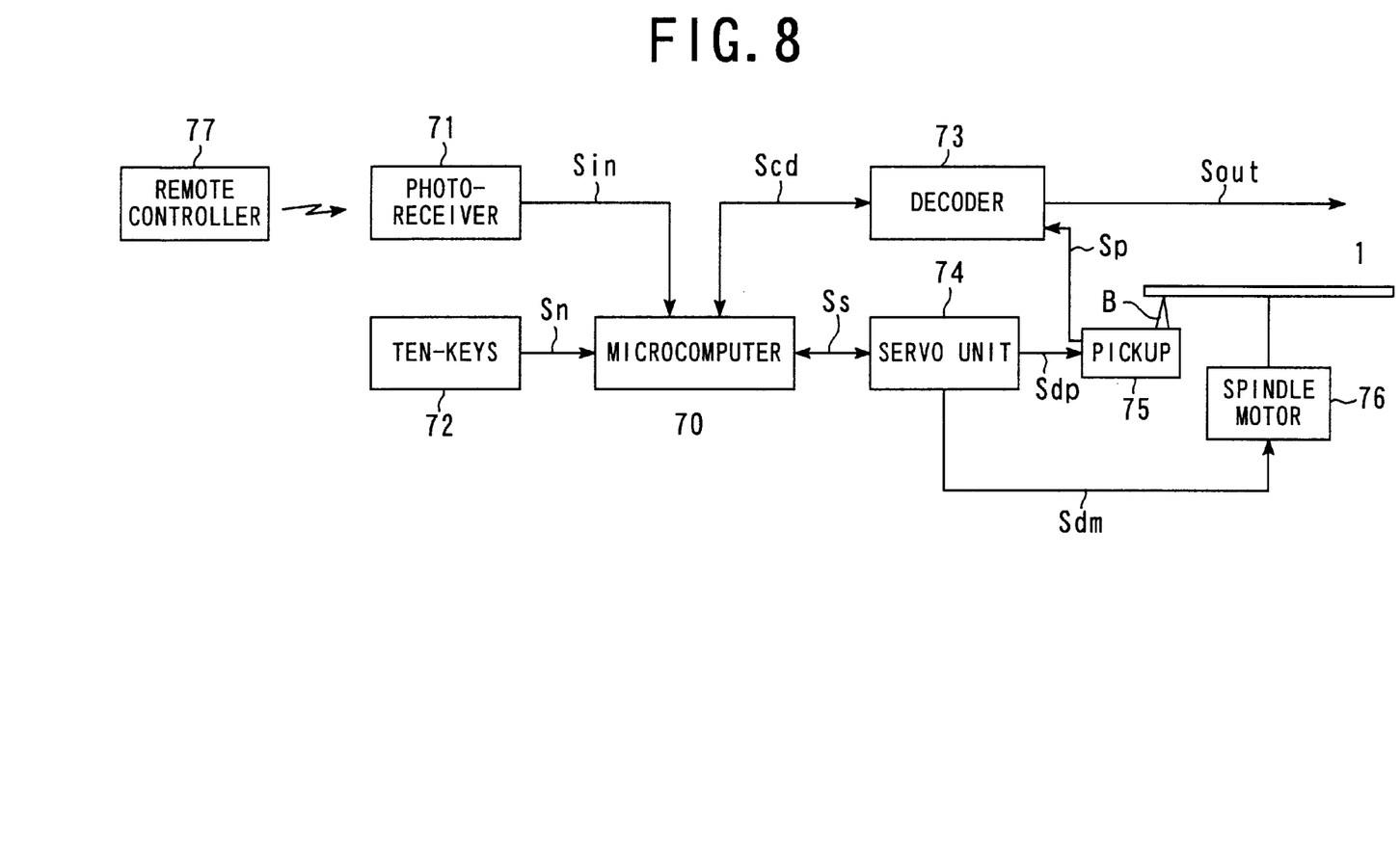
FIG. 8 is a block diagram illustrating an information reproducing apparatus in the embodiment of the present invention.
Figure 9:
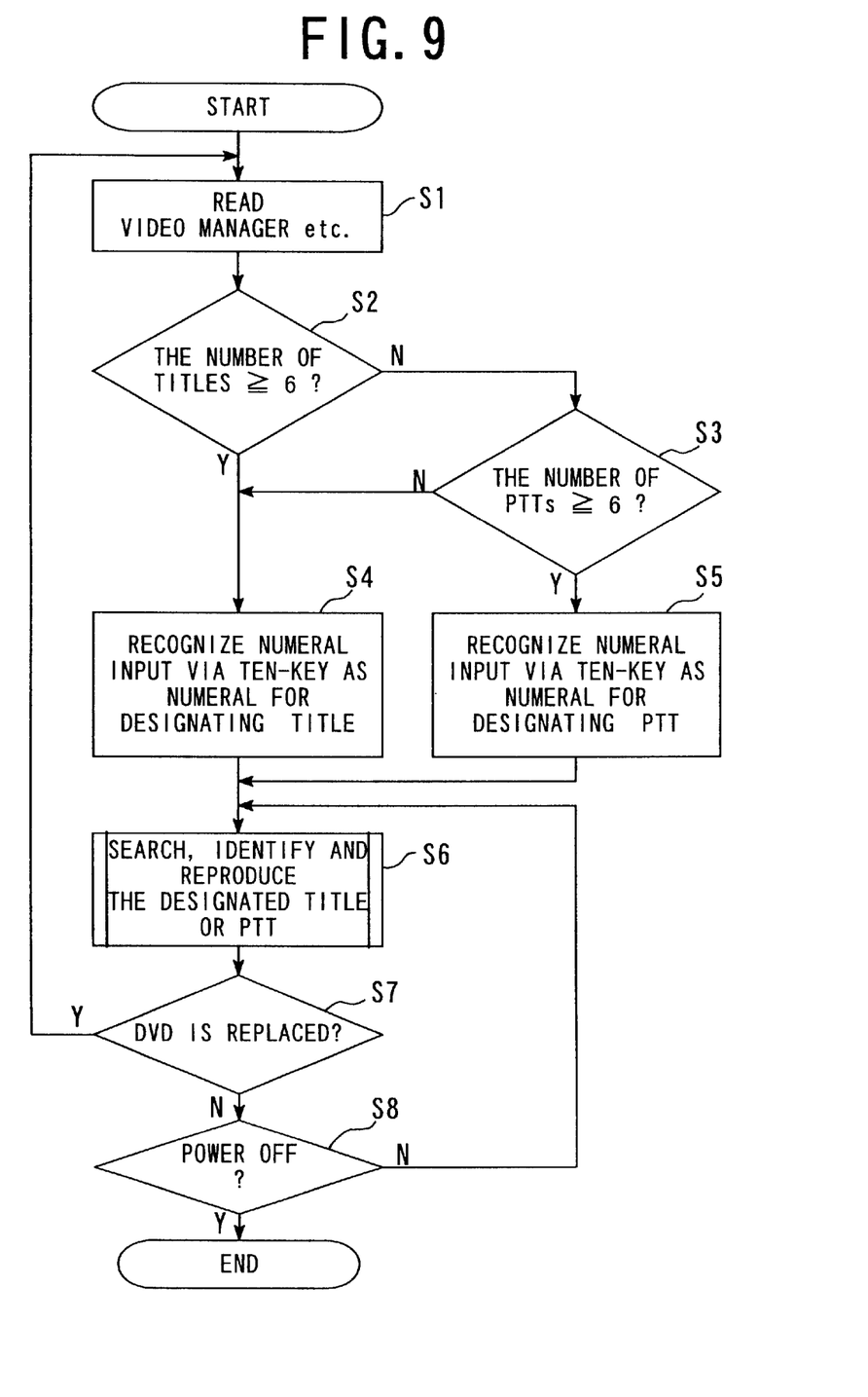
FIG. 9 is a flowchart showing reproduction operation of the information reproducing apparatus in the embodiment of the present invention.

Referring to FIGS. 8 and 9, a description will be given of an information reproducing apparatus for reproducing the recording information recorded on the above-described DVD 1. FIG. 8 is a block diagram illustrating the schematic configuration of the information reproducing apparatus in the embodiment of the present invention; and FIG. 9 is a flowchart illustrating the operation of the information reproducing apparatus in the embodiment.

As illustrated in FIG. 8, the information reproducing apparatus S in the embodiment comprises a microcomputer 70, a photo-sensor 71, ten-keys (numerical keys) 72, a decoder 73, a servo unit 74, a pickup 75, a spindle motor 76 and a remote controller 77.

Next, the basic operation will be explained below.

The pickup 75 radiates a light beam B onto the DVD 1 so as to detect the recording information recorded on the DVD 1 based on the reflected light beam, and then, produces a detection signal Sp corresponding to the detected recording information, outputting it to the decoder 73.

The decoder 73 decodes the detection signal Sp in response to a control signal Scd from the microcomputer 70, produces a reproducing signal Sout including a picture signal or audio signal corresponding to the recording information, outputting it to an outside display or speaker.

At this moment, the microcomputer 70 produces the control signal Scd in response to a photo-sensing signal Sin output from the photo-sensor 71. The photo-sensing signal Sin is a signal for designating the operation of the information reproducing apparatus S. When a user designates the operation of the information reproducing apparatus S by the use of the remote controller 77, infrared radiation is emitted from the remote controller 77. The photo-sensor 71 receives the infrared radiation to output the photo-sensing signal Sin accordingly.

Moreover, the microcomputer 70 controls constituent members disposed inside the information reproducing apparatus S in response to a designating signal Sn output from the ten-key 72. The designating signal Sn is a signal for designating the operation of the information reproducing apparatus S, and is output from the ten-key 72 operated by the user's operation of the ten-key 72. More specifically, the designating signal Sn includes signals indicating numerals input via the ten-keys 72, which correspond to an input instruction. The ten-keys 72 are disposed in an operation unit (not shown) mounted on the information reproducing apparatus S.

The servo unit 74 produces a servo signal Sdp in response to another control signal Ss from the microcomputer 70, and then, outputs it to the pickup 75. The servo signal Sdp is a signal for servo-controlling the position of an objective lens (not shown) housed inside the pickup 75. The servo control is performed in a direction perpendicular to an information recording surface of the DVD 1 (a focusing direction) and in a direction parallel to the information recording surface (a tracking direction).

In parallel with this, the servo unit 74 produces another servo signal Sdm for controlling an engine speed of the spindle motor 76 in response to the control signal Ss, and then, outputs it to the spindle motor 76.

Next, the reproducing operation of the information reproducing apparatus S will be explained with reference to FIGS. 7 and 9. The reproducing operation explained below is a reproducing operation in the case where the information reproducing apparatus S reproduces the DVD exclusive to the karaoke music having the hierarchical structure illustrated in FIG. 7. The flowchart of FIG. 9 illustrates a reproducing operation control program executed by the microcomputer 70.

First of all, the microcomputer 70 resets the entire information reproducing apparatus S, and further, reads various kinds of controlling data recorded on the DVD 1 (step S1). The controlling data read in step 1 includes the video manager 2. As a result, the title search pointer table information and the PTT information shown in FIG. 5 are read from the DVD 1, to be stored in the microcomputer 70. As described above, the title search pointer table information includes the number of title search pointers, i.e., the number of titles 62 recorded in the DVD 1. Moreover, the number of PTTs 67 depending on each title 62 is written in the PTT information.

Subsequently, the microcomputer 70 examines the title search pointer table information, and then, decides whether or not the number of titles 62 recorded in the DVD 1 is "6" or more (step S2). If the number is "6" or more (YES in step S2), the microcomputer 70 recognizes a numeral input onwards via the ten-key 72 as a numeral for designating the title 62 (step S4).

In contrast, if it is decided in step S2 that the number of titles 62 is not "6" or more (NO in step S2), the microcomputer 70 recognizes, per title, the number of PTTs 67 (chapters) dependent on each title 62 based on the PTT information. The microcomputer 70 decides whether or not a maximum value of the number of PTTs 67 is "6" or more (step S3). If the number of PTTs 67 is not "6" or more (NO in step S3), the routine proceeds to step S4. Consequently, the microcomputer 70 recognizes a numeral input onwards via the ten-key 72 as a numeral for designating the title 62 (step S4).

To the contrary, if it is decided in step S3 that the maximum value of the number of PTTs 67 is "6" or more (YES in step S3), the routine proceeds to step S5. Consequently, the microcomputer 70 recognizes a numeral input onwards via the ten-key 72 as a numeral for designating the PTT 67 (step S5).

In step S6, reproduction controlling processing is executed in order to actually reproduce the title 62 corresponding to the numeral recognized in step S4 or the PTT 67 corresponding to the numeral recognized in step S5.

More specifically, when the reproduction of the title 62 is carried out, the microcomputer 70 searches the high level of the hierarchical structure of the DVD 1 for the title 62 designated by an input numeral, identifies the designated title 62, and reproduces the identified title 62. On the other hand, when the reproduction of the PTT 67 is carried out, the microcomputer 70 searches the low level of the hierarchical structure of the DVD 1 for the PTT 67 designated by an input numeral, identifies the designated PTT 67, and reproduces the identified PTT 67.

Thereafter, the microcomputer 70 decides whether or not the DVD 1 is replaced (step S7). If it is replaced (YES in step S7), the routine returns to step S1, and then, the above-described routine is repeated. In contrast, if it is not replaced (NO in step S7), the microcomputer 70 confirms whether or not a power source of the information reproducing apparatus S is turned off (step S8). If the power source is not turned off (NO in step S8), the routine returns to step S6 to repeat the reproduction controlling processing. In contrast, if the power source is turned off (YES in step S8), the routine comes to an end.

In addition, in step S6, processing of searching the high or low levels for the karaoke song corresponding to the numeral input via the ten-key 72 is carried out. However, the present invention is not limited to this. For example, in the step S6, processing of reserving reproduction of the karaoke song corresponding to the numeral input via the ten-key 72 may be carried out.

As illustrated in the flowchart of FIG. 9, the microcomputer 70 decides whether the numeral input via the ten-key 72 is a numeral for designating the title 62 or a numeral for designating the PTT 67 (chapter) based on the number of titles 62 recorded on the DVD 1 and the maximum value of the number of PTTs 67s dependent on the title 62. Hereinafter, explanation will be made on the reason why this method can teach whether the input numeral is a numeral for designating the title 62 or a numeral for designating the PTT 67.

In the DVD exclusive to the karaoke music having the hierarchical structure illustrated in FIG. 7, the number of titles 62 is eight in total. Among the eight titles 62, the six titles 62 correspond to karaoke songs in a one-to-one manner (namely, each of the six titles 62 is composed of the first structure shown in FIG. 6A.), and two titles 62 have the PTTs 67 each corresponding to one karaoke song (namely, each of the two title 62 is composed of the second structure shown in FIG. 6B.). Consequently, in the hierarchical structure illustrated in FIG. 7, the number of titles 62 corresponding to the karaoke songs in the one-to-one manner is greater than the number of titles 62 having the PTTs 67 each corresponding to one karaoke song, and therefore, most of the titles 62 correspond to the karaoke songs in the one-to-one manner. In the case of reproduction of such a DVD, it is more convenient for the user to recognize the numeral input via the ten-key 72 as the numeral for designating the title 62.

In order to achieve the convenience, in the flowchart of FIG. 9, if the number of titles 62 recorded on the DVD 1 is six or more or the maximum value of the number of PTTs dependent on the title 62 is less than six, the numeral input via the ten-key 72 is recognized as the numeral for designating the title 62, because in this case, the number of titles 62 is sufficiently greater than the number of PTTs, so that most of the titles 62 can be determined to correspond to the karaoke songs in the one-to-one manner.

Also, if the number of titles 62 is less than six and the number of PTTs 67 dependent on each title 62 is less than six, the numeral input via the ten-key 72 is recognized as the numeral for designating the title 62, because in this case, it is certainly expected that the DVD1 is the DVD on which a small number of karaoke songs are recorded as the titles 62.

In contrast, in the case of reproduction of the DVD having the relatively large number of PTTs 67 each corresponding to one song, it is more convenient for the user to recognize the numeral input via the ten-key 72 as the numeral for designating the PTT 67 (chapter). In order to achieve the convenience, according to the flowchart of FIG. 9, if the number of titles 62 is less than six and the maximum value of the number of PTTs 67 dependent on the title 62 is six or more, the numeral input via the ten-key 72 is recognized as the numeral for designating the PTT 67 (chapter), because in this case, it is determined that the DVD has the relatively large number of PTTs 67 corresponding to one song.

The threshold value "6" in step S2 or S3 is determined on the basis of the general number of karaoke songs in the DVD exclusive to the karaoke music.

As described above, in the reproducing operation in the information reproducing apparatus S in the embodiment of the present invention, it is decided whether the numeral input via the ten-key 72 is the numeral for designating the title 62 or the numeral for designating the PTT (chapter) on the basis of the number of titles 62 or PTTs 67. Consequently, in the process of searching the karaoke song to be reproduced or of reserving the reproduction of the karaoke song, the numeral input via the ten-key 72 is appropriately recognized according to the hierarchical structure of the data recorded in the DVD. Therefore, it is possible to speedily execute the processing of searching the karaoke song to be reproduced or of reserving the reproduction of the karaoke song to be reproduced. Thus, the user can speedily select the karaoke song with ease.

Additionally, threshold values in both steps S2 and S3 are six. Thus, when the karaoke song is selected from DVD in which the karaoke music is recorded, the search operation can be speedily performed with ease.

Although in the above-described embodiment it is decided whether the numeral input via the ten-key 72 represents the title 62 or the PTT 67, other than this, for example, when a so-called skip key disposed in the not-shown operation unit is operated, it may be decided whether it represents a skip per title 62 or a skip per PTT 67, according to the routine illustrated in the flowchart of FIG. 9.

Furthermore, although in the above-described embodiment the total number of titles 62 and the maximum value of the number of PTTs 67 included in the title 62 are used in deciding whether the numeral input via the ten-key 72 represents the title 62 or the PTT 67, other than this, for example, there may be provided, in an empty space of the DVD 1, a flag indicating whether the DVD 1 is configured in the correspondence of one song to one title or of one song to one PTT (chapter), so as to decide what is indicated by the numeral input via the ten-key 72 on the basis of the detection of the flag.

Moreover, although in the above-described embodiment the DVD 1 is exclusive to the karaoke music, the present invention can be applied to the case where it is decided whether the numeral input via the ten-key represents the title or the PTT (chapter) in reproducing the recording information recorded on the DVD for use in devices other than the karaoke music.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-265480 filed on Sep. 18, 1998 including the specification, claims, drawings and summary is incorporated herein by reference in its entirety.

What is claimed is:

1. An apparatus for identifying one of a plurality of information units recorded on a recording medium, and reproducing the identified one of the plurality of information units, the plurality of information units being arranged in a hierarchical structure having a plurality of levels, the plurality of information units being divided into a plurality of groups, the plurality of groups being respectively assigned to the plurality of levels, the apparatus comprising:

an input device that receives an input instruction to designate one of the plurality of information units;

a number determination device that determines the number of the information units included in each of the plurality of groups;

a level determination device that determines, on the basis of a determination of the number determination device, one of the plurality of levels to be searched in order to identify one of the plurality of information units corresponding to the designated one of the plurality of information units; and a reproduction device that identifies one of the plurality of information units corresponding to the designated one of the plurality of information units by searching one of the plurality of levels determined by the level determination device, and reproduces the identified one of the plurality of information units.

2. The apparatus according to claim 1, wherein:

the plurality of information units are arranged in a hierarchical structure having a high level and a low level, the plurality of information units are divided into a first group and a plurality of second groups, the first group is assigned to the high level, the plurality of second groups are assigned to the second level, the plurality of second groups are respectively dependent on some or all of the plurality of information units included in the first group;

the number determination device determines the number of the information units included in the first group and a maximum number of the information units included in each of the plurality of second groups; and the level determination device determines that one of the plurality of levels to be searched in order to identify one of the plurality of information units corresponding to the designated one of the plurality of information units is the high level, when the number of the information units included in the first group is not less than a first predetermined number.

3. The apparatus according to claim 2, wherein the level determination device determines that one of the plurality of levels to be searched in order to identify one of the plurality of information units corresponding to the designated one of the plurality of information units is the low level, when the number of the information units included in the first group is less than the first predetermined number and when the maximum number of the information units included in each of the plurality of second groups is not less than a second predetermined number.

4. The apparatus according to claim 3, wherein the level determination device determines that one of the plurality of levels to be searched in order to identify one of the plurality of information units corresponding to the designated one of the plurality of information units is the high level, when the number of the information units included in the first group is less than the first predetermined number and when the maximum number of the information units included in each of the plurality of second groups is less than the second predetermined number.

5. The apparatus according to claim 4, wherein the first predetermined number is six, and the second predetermined number is six.

6. The apparatus according to claim 2, wherein the recording medium is a DVD, each of the plurality of information units included in the first group represents a title, each of the plurality of information units included in each of the plurality of second groups represents a chapter.

7. The apparatus according to claim 6, wherein the chapter is PTT (Part of Title).

8. The apparatus according to claim 1, wherein the input device receives the input instruction to designate one of the plurality of information units, in order to search the recording medium.

9. The apparatus according to claim 1, wherein the input device receives the input instruction to designate one of the plurality of information units, in order to reserve a reproduction of the designated information unit.

10. The apparatus according to claim 1, wherein the input device comprises a plurality of numerical switches to designate one of the plurality of information units.

11. The apparatus according to claim 1, wherein each of the plurality of information units is a karaoke song data.

* * * * *